United States Patent
Jasper et al.

(10) Patent No.: US 8,477,926 B2
(45) Date of Patent: Jul. 2, 2013

(54) CLOUD COMPUTING CALL CENTERS

(75) Inventors: John Jasper, Arlington Heights, IL (US); James A. Van Vleet, Fargo, ND (US); Nicole J. Hushka, Casselton, ND (US)

(73) Assignee: Bolder Thinking Communications, Inc., Columbus, OH (US)

( * ) Notice: Subject to any disclaimer, the term of this patent is extended or adjusted under 35 U.S.C. 154(b) by 718 days.

(21) Appl. No.: 12/762,216

(22) Filed: Apr. 16, 2010

(65) Prior Publication Data

US 2011/0255675 A1    Oct. 20, 2011

(51) Int. Cl.
*H04M 7/00* (2006.01)

(52) U.S. Cl.
USPC .................................. 379/221.01; 370/352

(58) Field of Classification Search
USPC ............ 379/112.01, 221.01, 221.02, 221.05, 379/221.06, 231, 232, 234, 225, 265.02, 379/112.06, 112.05, 114.08; 370/352
See application file for complete search history.

(56) References Cited

U.S. PATENT DOCUMENTS

| | | | | |
|---|---|---|---|---|
| 5,729,600 A | * | 3/1998 | Blaha et al. | 379/266.07 |
| 6,118,866 A | * | 9/2000 | Shtivelman | 379/309 |
| 6,333,979 B1 | | 12/2001 | Bondi et al. | |
| 2005/0240411 A1 | | 10/2005 | Yacoub | |
| 2009/0080639 A1 | | 3/2009 | Daye et al. | |
| 2010/0215155 A1 | * | 8/2010 | OHanlon | 379/88.04 |

FOREIGN PATENT DOCUMENTS

KR    10-2005-0119887 A    12/2005
WO    2011/130179 A2    10/2011

OTHER PUBLICATIONS

International Search Report and Written Opinion for International Application No. PCT/US2011/031973 mailed Nov. 16, 2011.

* cited by examiner

*Primary Examiner* — Olisa Anwah
(74) *Attorney, Agent, or Firm* — Porter, Wright, Morris & Arthur, LLP (57) ABSTRACT

Embodiments of the present invention generally relate to a cloud computing call center that may provide a multi-tenanted platform for scalable, dynamic allocation of telephony, PBX, and call center capabilities. Embodiments of the invention include implementations of a software telephony switch in a cloud computing environment that may dynamically allocate software based PBXes, virtual interactive voice responses (IVRs), and other system components to particular calls.

5 Claims, 5 Drawing Sheets

Active Services 350

| | Calls In Progress |
|---|---|
| 29 | 250 |
| 28 | 250 |
| 27 | 250 |
| 26 | 250 |
| 25 | 250 |
| 24 | 247 |
| 23 | 250 |
| 22 | 250 |
| 21 | 250 |
| 20 | 249 |
| 19 | 250 |
| 18 | 250 |
| 17 | 248 |
| 16 | 250 |
| 15 | 250 |
| 14 | 250 |
| 13 | 250 |
| 12 | 250 |
| 11 | 289 |
| 10 | 300 |
| 9 | 300 |
| 8 | 300 |
| 7 | 300 |
| 6 | 300 |
| 5 | 300 |
| 4 | 300 |
| 3 | 300 |
| 2 | 300 |
| 1 | 300 |
| 0 | 300 |

| Load Balancing Parameters | | 305 |
|---|---|---|
| Baseline Capacity 307 | 250 | |
| Surge Capacity 310 | 300 | |
| Time to Initiate New Service 315 | 90 | |
| Time before Deleting Unsued Service 320 | 300 | |

| Current Load | | 325 |
|---|---|---|
| Current Load 327 | 8083 | |
| Max Baseline Load 330 | 7500 | |
| Max Total Load 335 | 9000 | |
| Total Active Services 340 | 30 | |
| Service Shortage 342 | 3 | |

| Services Being Initialized (FIFO) | | 360 |
|---|---|---|
| | Initiate Time | |
| 0 | 85 Seconds | |
| 1 | 12 Seconds | |
| 2 | 2 Seconds | |

Bit Table 355

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| Available 357 | | | | | | | | | | | | | | | | | | Y | | Y | | | | | Y | | | | | |
| Available Surge 359 | | | | | | | | | | | | Y | Y | Y | Y | Y | Y | Y | Y | Y | Y | Y | Y | Y | Y | Y | Y | Y | Y | Y |

CLOUD COMPUTING CALL CENTERS

TECHNICAL FIELD

Embodiments of the invention relate generally to telephony systems.

BACKGROUND

Historically, infrastructure for telephony has been provided through physical, on-premise switches. The switches make the connections required to communicate with the public telephone network. Accordingly, to accommodate a certain number of calls, a corresponding number of switches would be required. This generally required a call center or other telephony customer to maintain an amount of switching hardware sufficient to support their anticipated peak call volume. For example, although most of the time the call volume is 75% of anticipated peak call volume, and consequently, only 75% of the switching hardware is used most of the time, the telephony customer nonetheless still must invest resources to maintain an additional 25% of switching hardware to handle occasional peak call volumes.

DETAILED DESCRIPTION

Certain details are set forth below to provide a sufficient understanding of embodiments of the invention. However, it will be clear to one skilled in the art that embodiments of the invention may be practiced without various of these particular details. In some cases, well-known software operations, server components, circuits, control signals, or timing protocols may not be shown in detail in order to avoid unnecessarily obscuring the described embodiments of the invention.

Embodiments of the present invention generally relate to a cloud computing call center. Embodiments of the cloud computing call center provide a multi-tenanted platform for scalable, dynamic allocation of telephony, PBX, and call center capabilities, which may offer improved economics for customers. Generally, a customer herein refers to an entity associated with one or more phone numbers which may be called. A customer may be an organization, a person, or another computer program process. Embodiments of the invention include implementations of a software telephony switch in a cloud computing environment. In contrast to previous telephony systems, embodiments of the cloud computing call center may dynamically allocate software based PBXes, dial-plans, virtual interactive voice response services (IVRs), and/or other system components to particular calls and/or PBXes. In this manner, dynamic allocation of telephony components may avoid a need to dedicate resources to one particular customer.

Furthermore, embodiments of the present invention include load balancing such that server capacity may be allocated and deallocated as demand changes. An amount of hardware resources, including processing power and memory, may be dynamically adjusted based on a total load of the cloud computing call center. The hardware resources devoted to call processing may therefore change as the call volume changes. Accordingly, the call center provider may only pay for computing resources needed to handle a current call volume, and the need for dedicated computing resources sufficient to handle anticipated peak demand may be avoided.

Implementation of a software telephony switch in a cloud computing environment may enable the delivery of telephony capabilities using a large, redundant array of servers. As will be described further below, each instance of a software telephony switch may serve many customers, at least because the customer-specific telephony resources may be dynamically allocated. Accordingly, the dynamic scale and dynamic allocation of resources may allow for the handling of a large number of simultaneous calls for a large number of customers. In some embodiments, as many as 10s or 100s of thousands of simultaneous calls may be handled.

Additionally, a number of features may flexibly be provided to any or all customers of the cloud computing call center. Features may include, for example, speech recognition, speaker recognition and emotion detection. The features may also be implemented in a cloud computing environment and be utilized in an on-demand manner by multiple customers.

In other embodiments, examples of the cloud computing call center may allow for customer-to-customer calling without going through the public switched telephone network.

Figure 1:
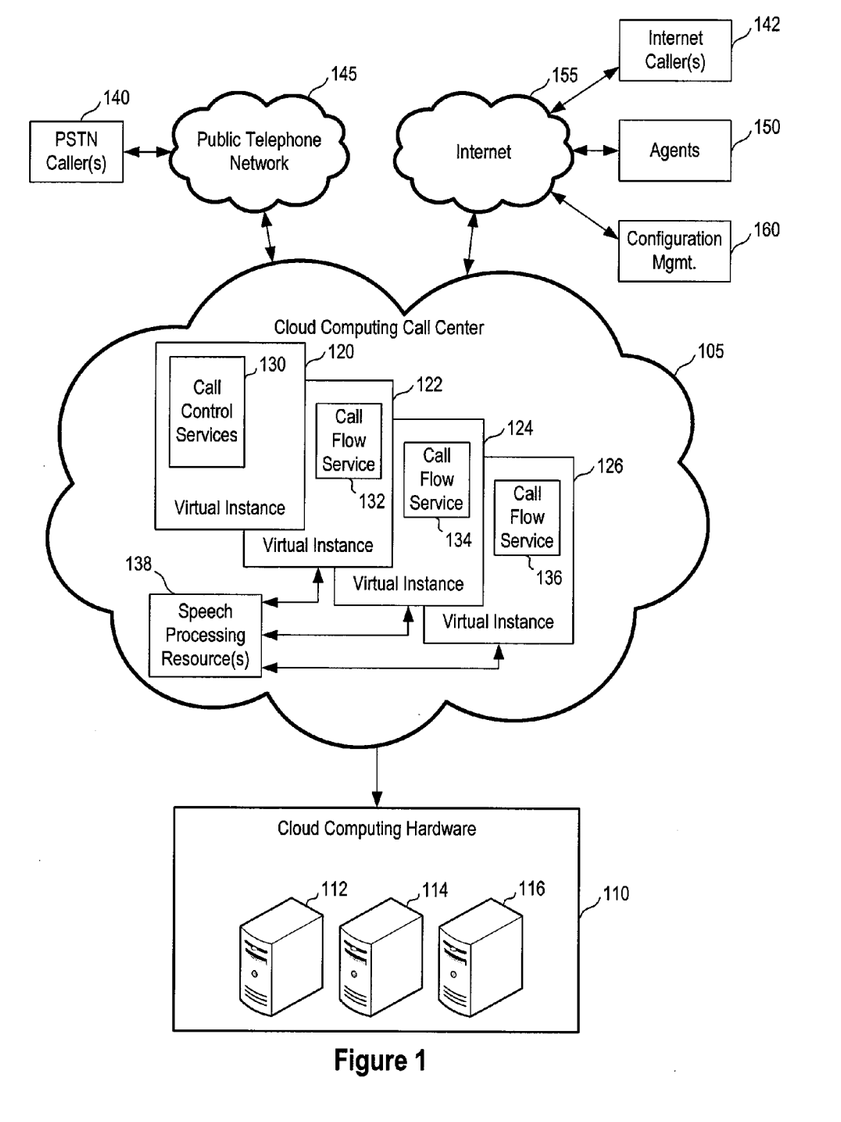
FIG. 1 is a schematic illustration of a telephony system including a cloud computing call center in accordance with an embodiment of the present invention.

FIG. 1 is a schematic illustration of a telephony system including a cloud computing call center in accordance with an embodiment of the present invention. A cloud computing call center 105 may be operating on all or a portion of cloud computing hardware 110, including servers 112, 114, and 116. The cloud computing call center includes one or more virtual instances 120, 122, 124, and 126. One of the virtual instances 120 may implement call control services 130. The virtual instances 122, 124, and 126 implement call flow services 132, 134, and 136, respectively. The call flow services 132, 134, 136 may service calls between or among public telephone network callers 140 over a public telephone network 145, or Internet callers 142 and agents 150 communicating with the cloud computing call center 105 over an Internet 155. The call flow services 132, 134, 136 may utilize services provided by any number of speech processing resources 138 which may be provided by the cloud computing call center 105. Configuration management tools 160 may also be provided to administer aspects of the cloud computing call center 105. Generally, as will be described further below, the call flow services 132, 134, 136 may service multiple customers by dynamically allocating customer-specific telephony resources to the calls. Further, as will also be described further below, the call control services 130 may monitor call volume in the cloud computing call center 105 and allocate or deallocate additional virtual instances and/or additional call flow services in accordance with demand. In this manner, the cloud computing call center 105 may utilize only as much cloud computing hardware 110 as required for the present call volume in some embodiments.

The cloud computing call center 105 may be implemented in a public or private cloud computing environment. Commercial cloud computing environments may be used, such as Amazon's EC2 system or other similar systems. In some embodiments, a combination of commercial cloud computing environments may be used. In some examples, virtual instances may be created within separate cloud computing environments but may function in the same manner as if they all operated within the same cloud computing environment. Generally, the cloud computing environment may provide the cloud computing hardware 110. The cloud computing hardware 110 may include any number of servers or other arrangement of processing units and electronic storage. The cloud computing environment may also provide a capability to run multiple virtual instances, such as the virtual instances 120, 122, 124, and 126, on portions of the cloud computing hardware 110. In particular, each virtual instance may be implemented as a logical partition within a physical server that may house a unique operating system and software stack. Accordingly, each virtual instance 120, 122, 124, and 126 may include all or a portion of a computer readable medium encoded with instructions causing one or more processing units in the cloud computing hardware 110 to perform the described functions of the virtual instance. Many virtual instances may be active within a single physical server. In some examples, an operator of the cloud computing call center 105 may pay a commercial cloud computing provider according to a number and size of virtual instances running. The virtual instances may have a size specified by a processing power and memory size allocated to the instance, and cost may be based on the processing power and memory size. The cloud computing environment may allow for on-demand allocation of virtual instances that may allow new virtual instances to be available for processing instantaneously, or within seconds or minutes. Similarly, virtual instances may be deallocated from the cloud computing environment in a dynamic manner. A variety of implementations for running virtual instances on the cloud computing hardware and allocating physical hardware to virtual instances are known in the art and may be used.

The cloud computing call center 105 generally implements call control services 130 which may receive calls for any number of phone number-associated entities. The call control services 130 route the calls to available call flow services. In this manner, each call control services 130 may route calls to multiple call flow services. Once a call is routed to a call flow service, the call control services 130 may no longer be involved in handling the call. Each call flow service may load an appropriate dialplan or other call treatment for each received call and process the call in accordance with the loaded dialplan. A dialplan may specify the use of one or more of the speech processing resources 138. Each call flow service may load multiple dialplans to service multiple phone number owning entities simultaneously in some embodiments. In an analogous manner, outbound calls may be routed by the call control services 130 to one of the call flow services, and the call flow service may load a dialplan associated with the customer making the outbound call.

Only a single version of the call control services 130 need be provided in some embodiments, routing calls to multiple call flow services. In some embodiments, multiple versions of call control services 130 may be operating in the cloud computing call center 105, which may advantageously improve fault tolerance and redundancy. Furthermore, updates may be conducted on the fly, while the call control services 130 are operating in that dialplans or other call treatment information may be changed, and the new information loaded by a call flow service the next time a call is received. Moreover, as described below, call flow services may be de-allocated to cease handling calls.

Accordingly, if an update to a call flow service is desired, new call flow services employing the update may be added, and the old call flow services may no longer receive new calls, and may be de-allocated once the calls are complete. Still further, if an update to the call control services 130 is desired, a new call control services program may be started in parallel with the call control services 130, and subsequent calls may be routed to the new call control services. The call control services 130 may then be de-allocated when it is no longer processing calls. In this manner, upgrades may occur during operation of the cloud computing call center 105.

Three virtual instances 120, 122, 124, and 126 are shown in FIG. 1, however any number may be used, and the number of virtual instances included in the cloud computing call center 105 may change in accordance with the load on the call computing call center 105. Call control services 130 may allocate additional virtual instances or deallocate virtual instances based on the number of calls handled by the instances 120, 122, 124, and 126. That is, the call control services 130 may be programmed in some embodiments with a high threshold value and a low threshold value. If a number of calls being handled by the existing instances equals or exceeds the high threshold value, the call control services 130 may add one or more additional instances. If the number of calls being handled by the existing instances equals or is less than the low threshold value, the call control services 130 may deallocate one or more instances. Call control services will be described further below. In some embodiments, one or more extra call flow services may be provided beyond a number dictated by current capacity. The extra call flow services may be advantageous to handling a sudden increase in load.

Three call flow services 132, 134, 136 are shown in FIG. 1, with one call flow service running on each of the virtual instances 122, 124, and 126. Any number of call flow services may be used, and in some embodiments more than one call flow service may be operated by a single virtual instance. In some embodiments, the call control services 130 may be implemented in a same virtual instance as one or more of the call flow services 132, 134, and 136. It is generally to be understood that the arrangement of virtual instances, cloud computing hardware, and distribution of call control services and call flow services is quite flexible. Each call flow service 132, 134, 136 may handle calls for multiple customers. Each call flow service 132, 134, 136 may dynamically allocate telephony resources, such as interactive voice responses or other customer-specific resources, such as a speech processing resource, to a call. In this manner, the call flow services 132, 134, 136 may be multi-tenanted services.

The call flow services 132, 134, 136 may apply one or more shared speech processing resources 138 to calls. The speech processing resources 138 may include, for example, speech recognition, speaker recognition, text-to-speech, or emotion detection, or combinations thereof. In this manner, a feature such as speech recognition may be simultaneously allocated to up to hundreds or thousands of calls.

In some embodiments, one or more of the call flow services 132, 134, 136 may be combined, such as by being cross-connected. The call flow services may enable telephony resources, such as speech processing resources 138, to be allocated to the cross-connections. This may allow, for example, a conference bridge to operate across a plurality of call flow services. Connections between the call flow services may also be dynamically allocated based on demand and may be increased or decreased as specified by a dialplan.

Callers 140, 142 generally refer to entities placing telephone calls to one or more agents 150 or other entities associated with a telephone number called. The callers 140, 142 are generally associated with one or more devices placing a call, such as, but not limited to, telephones, cellular phones, or Internet-enabled devices. The agents 150 may accordingly be, for example, associated with enterprises such as restaurant chains or call center operators. Callers 142 may place calls by communicating over a network 155, for example, over the Internet using voice over IP (VoIP). Callers 140 may place calls by communicating over a public telephone network 145. The cloud computing call center 105 receives calls from the Internet 155 and/or public telephone network 145 and connects the caller with the called agent 150, which may be accessible via the Internet 155, or via the public telephone network 145 in some embodiments. There may be many connections to the PSTN 145. Outbound calls may be routed out through a connection to the PSTN 145 based, in some embodiments, on a total cost of the underlying PSTN service. The cloud computing call center 105 may receive the call, and the call may be processed by one of the call flow services 132, 134, 136. The call flow service may load and utilize a particular call treatment associated with the number called. The call treatment may include an interactive voice response or other functionality. In this manner, the call flow service may function as a software PBX.

Configuration management tools 160 may be provided and coupled to the cloud computing call center 105 over an interne 155 to manage parameters of the cloud computing call center 105, such as the available telephony resources or other configurations specific to one or more entities associated with a called number, or control the manner in which instances are allocated or de-allocated, such as by adjusting the high and low threshold values described above. The configuration management tools may be available over the Internet and may allow for immediate modification of one or more dialplans. Modifications may be immediately available to call flow services of the cloud computing call center 105. Additional tools may also be provided including, but not limited to, an ability for customers to monitor queued calls associated with the customer's phone number or phone numbers, and the ability to monitor queue performance, agent performance, agent state, and the like.

Figure 2:
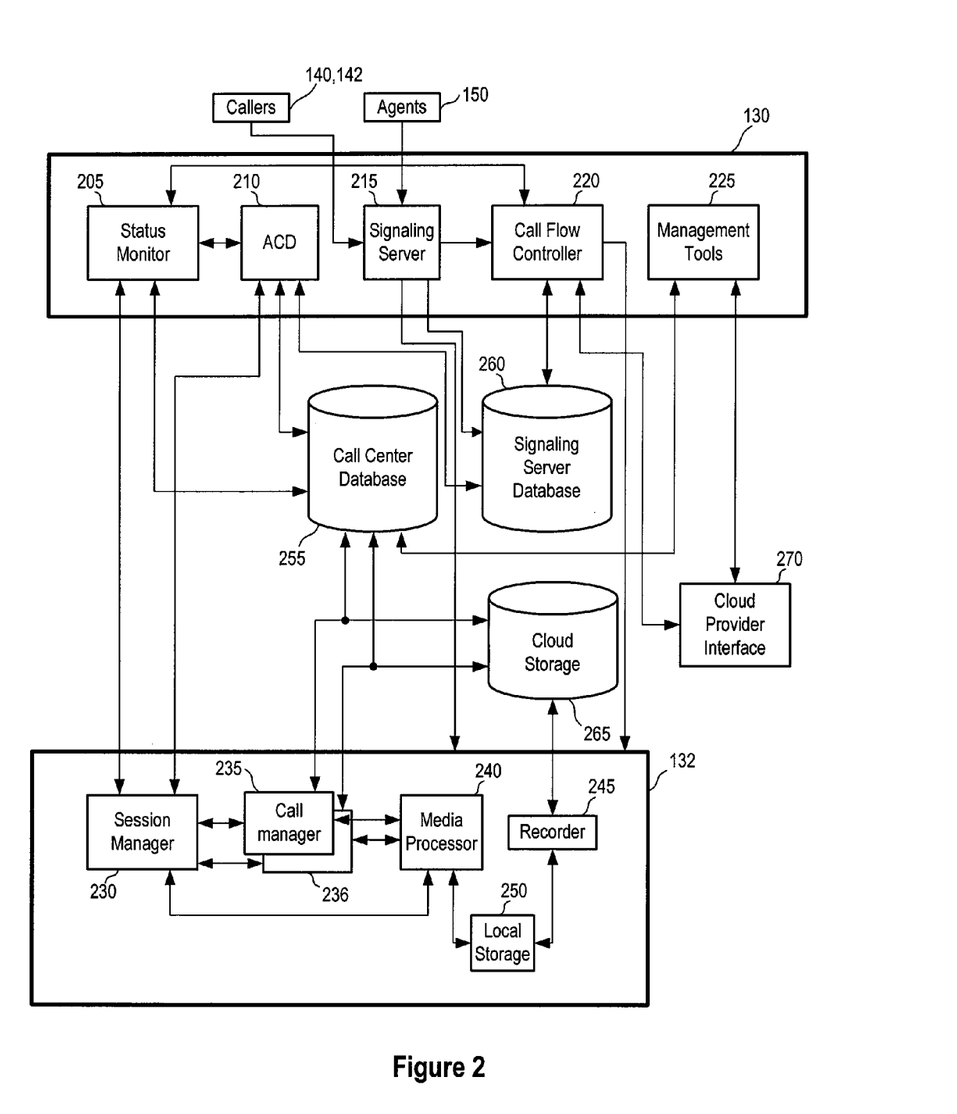
FIG. 2 is a schematic illustration of some components of a cloud computing call center in accordance with embodiments of the present invention.

FIG. 2 is a schematic illustration of some components of a cloud computing call center in accordance with embodiments of the present invention. Example components of call control services 130 and the call flow service 132 are shown. The call control services 130 may include a status monitor 205, an automatic call distributor 210, a signaling server 215, which may be a SIP proxy, a call flow controller 220, and management tools 225. These components may be implemented as executable instructions stored on computer readable medium on cloud computing hardware associated with the virtual instances 120 and 122. The executable instructions may be executed by one or more processing units of the cloud computing hardware 110 to provide the described functionalities. Although shown as separate components, some or all of the components 205, 210, 215, 220, 225 may not be physically separate, and may be implemented in software code encoded on a same computer readable medium in some embodiments. The call control services 130 may communicate with a cloud provider interface 270, described further below.

The call control services 130 generally receive calls from callers 140, 142. The call control services 130 select an appropriate call flow service to process each call. The selection of the call flow service may be based on the load of each of the call flow services at or around the time the call is received by the call control services 130. The selected call flow service, such as the call flow service 132 may then load a dialplan or other customer specific resources based on the number called. The call flow service 132 may then process the call in accordance with the loaded dialplan. Implementations of these functions are described in further detail below.

The call flow service 132 may include a session manager 230, one or more call managers 235, 236, a media processor 240, and a recorder 245. The call flow service 132 may also include a local storage 250. Again, these components may be implemented as executable instructions stored on computer readable media on cloud computing hardware associated with the virtual instance 120. The executable instructions may be executed by one or more processing units of the cloud computing hardware 110 to provide the described functionalities. Although shown as separate components, some or all of the components 230, 235, 236, 240, 245 may not be physically separate, and may be implemented in software code encoded on a same computer readable medium in some embodiments, and in some embodiments may be combined with components of the call control services 130. It is to be understood that the physical location and implementation of the components may be flexible.

The call control services 130 and the call flow service 132 may access stored data in a call center database 255, signaling server database 260, and cloud storage 265. The signaling server database 260 may be a SIP proxy database. Although shown as separate databases, in some examples, some or all of the databases 255, 260, and 265 may be combined. One or all of the databases 255, 260, and 265 may reside on the cloud computing hardware 110 of FIG. 1.

As generally described above, the call flow service 132 may be utilized by more than one customer, that is, more than one entity associated with called numbers. In some embodiments, or at certain points in time, it may be that the call flow service 132 is used by a single customer, however the call flow service 132 functions in a manner which allows it to be utilized by multiple customers. Incoming calls designated for the call service 132 may be received by the call service 132 from a signaling server, such as a SIP proxy, described further below. The media processor 240 of the call service 132 may function to process the call and may, for example, provide conversion from audio files to another media format or conduct other media processing desirable for processing the call.

A call manager 235 may be provided for each call, and the media processor 240 may provide information about a call to the call manager 235. In particular, the call manager 235 may receive information about the called number using, in some embodiments, a called number. In some embodiments, for outbound calls the customer placing the call may be identified based on the SIP device used to the place the call. Based on the called number or SIP device, the call manager 235 may load customer-specific resources such as, but not limited to, a dialplan, and/or one or more audio files associated with an interactive voice response system for the customer associated with the called number. The dialplan and/or audio files may be stored in the call center database 255, cloud storage 265, or both, or in a cache or another location accessible to the call manager 235.

The dialplan, which may also be referred to as a call treatment, may include any of a variety of information regarding the processing of a call associated with a particular customer and/or a particular phone number. The information may include, for example, how to handle a call when all agents of the customer are busy (such as by sending the call to a queue), when to transfer the call to a voice mail system, four-digit or other extension dialing preferences, and the like. In some embodiments, a dialplan may specify that a speech processing resource is attached to a call. The dialplan may also specify that the call be routed back through a public telephone network. In this manner, the system in some embodiments may provide speech processing resources to existing call centers and/or PBXes without necessarily requiring installation of new equipment in some embodiments. A dialplan generally refers to specific rules and actions that may occur or apply to calls, whether inbound or outbound. The dialplan may include scripts, voice xml, software, configuration parameters, or combinations thereof that specify the rules and actions. The retrieved information may be stored in a cache (not shown in FIG. 2), and the call manager 235 may access the cache to load the customer-specific data prior to checking remote databases in some embodiments. The customer-specific telephony resources loaded by the call manager 235 may then be used to conduct the call.

In some embodiments, the call flow service may verify a most recent version of the dialplan is stored in cache. In some embodiments, the most frequently used dialplans, or dialplans receiving over a threshold amount of use, may initially be stored in a cache of a new call flow service. In this manner, some dialplan access time may advantageously be saved. By loading a dialplan specific to each call, the dialplans may have conflicting settings and still be used to process calls. For example, one customer may have a dialplan specifying that extension 1234 be associated with one telephony resource (such as, but not limited to, a phone, call queue, or conference capability), while another customer may have a dialplan specifying that extension 1234 be connected to a different telephony resource. Because the dialplans may be loaded and utilized by the call flow service on a per-call basis, the seemingly conflicting dialplans may nonetheless be properly implemented. Audio information about the call in process may be provided to the media processor 240, and the media processor 240 may write data generated during the call or other data about the call to the local storage 250. In some embodiments, the recorder 245 may record calls and upload them from the local storage 250 to cloud storage 265. Other components may be provided as desired for implementation of other speech processing resources 138 of FIG. 1.

The session manager 230 monitors calls being processed by the call flow service 132. That is, the session manager 230 monitors calls being processed by the media processor 240 and/or the call managers 235 and 236. The session manager 230 is in communication with the call center control service 130 to provide status information about the call flow service 132, such as the number of calls in process. Communication between the call managers 235, 236, media processor 240, and the session manager 230 may be implemented using any suitable software protocol, such as inter-process communication (IPC).

In this manner, the call flow service 132 may receive call information, including a dialed number, load customer-specific resources based on that dialed number, such as dialplans or audio files, and process the call using the loaded resources. Any number of calls may be processed by the call flow service 132, and one call manager may be provided for each call. Each call manager may load different customer-specific resources for different calls, and the call flow service 132 accordingly may provide a multi-tenanted call processing solution.

As generally described above, the call control services 130 may allow for dynamic allocation and de-allocation of additional virtual instances to the cloud computing call center 105. Referring to FIG. 2, the call control services 130 may include a signaling server 215. Any number of agents or callers may connect to the signaling server 215 over an Internet or other network connection. The signaling server 215 may maintain user registration for customers, agents, and/or agents using the cloud computing call center 105. The signaling server 215 may not process the audio in the calls, but may process signaling parameters of the calls received. The call audio may be processed by a media processor 240 of a call flow service, as described above. However, the signaling server 215 may initially receive the call and distribute received calls to a selected call flow service of the cloud computing call center 105. The appropriate call flow service may be selected in a variety of ways. In some embodiments, the least utilized call flow service at the time the call is received by the signaling server 215 may be used. In other embodiments, the least utilized call flow service measured at a different time may be used. In other embodiments, the signaling server 215 may route incoming calls to a same call flow service until the call flow service reaches capacity, or a threshold, and then another call flow service may be selected for subsequent calls. In the embodiment of FIG. 2, the signaling server 215 may be configured to route incoming calls to the least used call flow service and the call flow service 132 may be the least used call flow service of the cloud computing call center 105, accordingly, an incoming call may be provided by the signaling server 215 to the media processor 240.

Recall as described above the session manager 230 may monitor calls being processed by the call flow service 132. Similarly, other session managers for other call flow services may monitor calls processed by their respective services. The session managers may provide information about the load of their respective call flow service, such as a number of calls in process, to the call flow control services 132. The information may, for example, be provided to a status monitor 205. The status monitor 205 may also receive information from the session manager 230 regarding call or service updates. The status monitor 205 may store received information in the call center database 255, or other storage accessible to the status monitor.

The status monitor 205 may be in communication with the call flow controller 220 to provide load information regarding the call flow service 132 and other call flow services to the call flow controller 220. In other embodiments, the call flow controller 220 may receive load information directly from the call flow service 132 or other call flow services in the cloud computing call center 105. The call flow controller 220 may accordingly monitor a load on one or more of the call flow services in the cloud computing call center 105. The call flow controller 220 may store load information for each of the call flow services into a signaling server database 260. The load information may be updated as frequently as desired. The call flow controller 220 may provide a command to the signaling server 215 to query the information in the signaling server database 260 following updating the database. The signaling server database 260 may be implemented, for example, as a configuration for the signaling server 215. The signaling server 215 accordingly may query the load information stored in the signaling server database 260 and utilize the load information to determine which call flow service to receive a next received call. In other embodiments, other messaging protocols may be used between the signaling server 215 and the call flow controller 220 to communicate load information.

The call flow controller 220 accordingly may receive and/or access load information about the call flow services in the cloud computing call center 105. The call flow controller 220 may also allocate or de-allocate call flow services based on the load information. For example, when a number of call flow services are at or above a load corresponding to a high threshold value, the call flow controller 220 may allocate a new call flow service to the cloud computing call center 105. The allocation may be performed by the call flow controller 220 itself, or the call flow controller 220 may communicate with a cloud provider interface 270, such as an API provided by a commercial cloud provider, to allocate additional instances to the cloud computing call center 105.

Similarly, when the cloud computing call center 105 is operating at a load below a low threshold value, the call flow controller 220 may de-allocate one or more call flow services from the cloud computing call center 105. An indication may be provided to the signaling server 215 or stored in the signaling server database 260 that a particular call flow service is to be de-allocated, and no incoming calls will be routed to the de-allocated call flow service. Once the calls have been completed, the call flow service is de-allocated from the cloud computing call center 105. The de-allocation may be performed by the call flow controller 220 itself, or the call flow controller 220 may communicate with the cloud provider interface 270 to de-allocate one or more instances. Generally, in some embodiments, an oldest call flow service may be deallocated first, which may advantageously reduce memory leaks and increase stability of the system. During de-allocation, data stored locally at the call flow service itself may be uploaded to the cloud storage 265. That is, for example, if the call flow service 132 receives an indication from the call flow controller 220 or the cloud provider interface 270 to de-allocate, data stored in the local storage 250 or other storage local to the call flow service 132 may be uploaded to the cloud storage 265. In this manner, the data may be accessible to other call flow services or call control services in the cloud computing call center 105. Further, any reporting information, such as event data, may be provided by the session manager 230 to the status monitor 205 responsive to an indication to de-allocate. In this manner, storage and reporting information may be transferred from the call flow service 132, and the call flow service 132 may be safely de-allocated.

The call flow control services 130 may also include one or more automatic call distributors (ACDs) 210. The ACDs may function, as known in the art, to queue one or more calls awaiting an agent of a particular customer. The ACD 210 may maintain a virtual queue for each customer, and provide status information regarding the queue to the status monitor 205. The ACD 210 may provide callers from a queue to an appropriate call flow service, such as the call flow service 132. However, the ACD 210 in some embodiments, such as shown in FIG. 2, may not be part of the call flow service 132 and may communicate with multiple call flow services. In this manner, queued users may be distributed across multiple call flow services as desired. Likewise, agents, who may be actively serving customers, may be allocated across multiple call flow services. So, for example, the ACD 210 may access the signaling server database 260 to determine if a suitable agent 150 is available to handle a call. If no suitable agent is available, the ACD 210 may communicate with the call flow service 132 to hold the call, such as by playing holding music, or other action which may be specified by a customer's dialplan. When a suitable agent becomes available, the ACD 210 may communicate with the call flow service 132 to route the call to the available agent. Because the ACD 210 may communicate with any or all call flow services in the cloud computing call center, the ACD 210 is a shared resource and need not be duplicated for each call flow service. Furthermore, the ACD 210 may be shared among many customers, each maintaining their own queue. That is, the ACD 210 may maintain multiple queues of callers awaiting agents. In summary, there may be multiple ACDs in some embodiments, and each ACD may service multiple call flow services. Moreover, each ACD may be implemented separate from the call control services.

The call flow control services 130 may also include management tools 225 which may allow customers or other entities to administer the cloud computing call center 105. For example, to add agents, manage the load balancing process implemented by the call flow controller 220 such as changing the threshold values, make test calls, or change or add customer-specific resources, such as but not limited to dialplans, interactive voice response services and configurations, audio assets, and other telephony resources. The management tools 225 may be implemented as web services, and may also be in communication with the cloud provider interface 270 for adding virtual instances to the cloud computing call center 105.

Additional features may be provided to the cloud computing call center 105 and accessible to any or all of the virtual instances 120, 122, and 124 in FIG. 1. The additional features may include substantially any process for manipulating or interacting with data generated during a call such as, but not limited to, voice recognition or emotion recognition. In this manner, any customer of the cloud computing call center 105 may utilize the service without requiring a dedicated feature for each call flow service.

Figure 3:
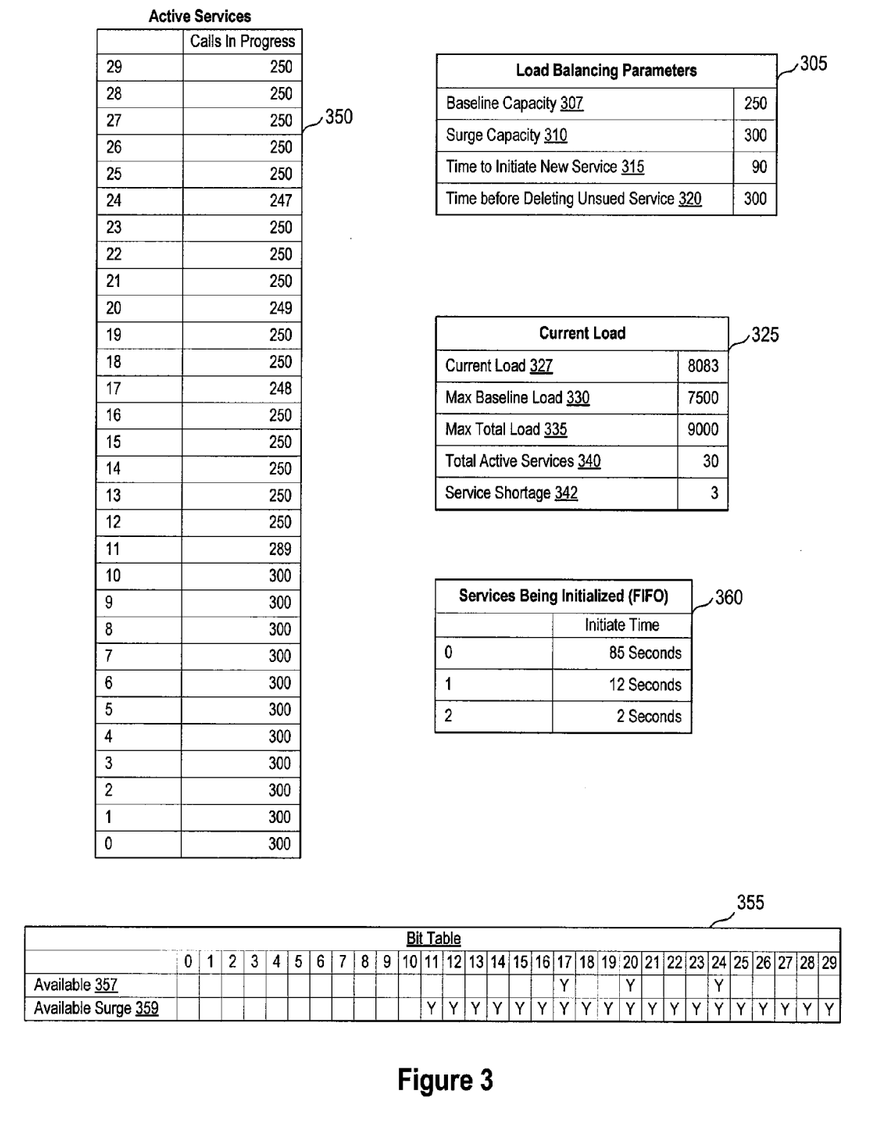
FIG. 3 is a schematic illustration of data that may be used to allocate and de-allocate virtual instances from the cloud computing call center in accordance with embodiments of the present invention.

FIG. 3 is a schematic illustration of example data that may be used to allocate and de-allocate virtual instances from the cloud computing call center in accordance with embodiments of the present invention. The data may be stored, for example, in the signaling server database 260 of FIG. 2, or in another location accessible to the call flow controller and/or signaling server 215. Load balancing parameters may be stored in a table 305. The load balancing parameters may include a baseline capacity 307. The baseline capacity 307 is equal to 250 calls in the embodiment shown in FIG. 3, but any suitable number may be used. The baseline capacity 307 refers to a number of calls to be handled by a single call flow service before providing a next incoming call to a different call flow service in some embodiments. The baseline capacity may be used until all available call flow services are utilized at the baseline capacity. The baseline capacity 307 may serve as the high threshold mentioned above.

A surge capacity 310 may also be specified and stored. The surge capacity 310 refers to a number of calls to be handled by a single call flow service when all available call flow services are at or above the baseline capacity. The surge capacity 310 is 300 calls in the embodiment shown in FIG. 3, but any suitable number may be used. The surge capacity 310 may also serve as the high threshold value described above. A time 315 needed to initiate a new server may also be stored. The time is 90 seconds in the embodiment of FIG. 3, but may vary in accordance with the time needed to set up a call flow service on a newly allocated virtual instance. The time may be taken into account when a new virtual instance is available to service a new call, described further below. A time 320 before deleting an unused call flow service may also be stored. The time is 300 seconds in the embodiment of FIG. 3, but any number may be used, and the time may be dynamically calculated by the call flow controller or another system component based on inter-arrival rates of calls.

A current load table 325 may also be stored. The current load table 325 may specify a current load 327 of the cloud computing call center, 8083 calls at the time shown in the embodiment of FIG. 3. The current load 327 may be reported, for example, by the call flow controller 220 of FIG. 2. The current load table 325 may also store a maximum baseline load 330. The maximum baseline load 330 is 7500 calls in the embodiment shown in FIG. 3, and the maximum baseline load 330 will generally be equal to the number of available call flow services multiplied by the baseline capacity 307. A maximum total load 335 may also be stored. The maximum total load 335 is 9000 calls in the embodiment shown in FIG. 3, and is generally equal to the number of available call flow services multiplied by the surge capacity 310. A number of total active call flow services 340 may also be stored, and is equal to 30 in the embodiment shown in FIG. 3. The total number of active call flow services 340 reflects a number of available call flow services in the cloud computing call center. A service shortage 342 may also be stored. The service shortage 342 is generally equal to a number of additional call flow services needed to bring the current load 327 to be equal to or less than the max baseline load 330. The service shortage 342 is three call flow services in the embodiment of FIG. 3, because the current load 327 is 583 calls over the maximum baseline load, and three additional call flow services at 250 calls baseline capacity per service would increase the baseline load sufficiently to accommodate the current load 327.

Although shown as separate tables in FIG. 3, the load balancing parameters 305 and current load 325 tables may be combined. In some embodiments, not all the shown entries may be present in each table, and in some embodiments additional parameters may be included. The call flow controller 220 of FIG. 2 may update the parameters in the tables 305 and 325, including but not limited to, the current load 327 and total active call flow services 340. The management tools 225 may also update the values in the tables 305 and 325, including but not limited to that baseline capacity 307, surge capacity 310, time to initiate new call flow service 315, and time before deleting unused call flow service 320.

An active services table 350 may also be stored. The active services table 350 may be a first-in first-out table, although other implementations may be used. The active services table 350 provides an identifier for each available call flow service and a number of calls being processed by the call flow service. For example, call flow services numbered 0-29 are shown in FIG. 3, along with the number of calls each call flow service is handling. As shown in FIG. 3, the call flow services identified as 0-10 are operating at the surge capacity of 300 calls. The call flow services identified as 11-16, 18-19, 21-23, and 25-29 are operating at the base capacity of 250 calls. The signaling server 215 may access the active services table 350 to determine where to route a next incoming call. In some embodiments, the next incoming call may be routed to a call flow service below baseline capacity and lowest in the active services table 350, for example, the call flow service number 17 in the example of FIG. 3. If two call flow services are below the baseline capacity, a lowest call flow service on the table may be used in some embodiments, although other implementations may be used to route an incoming call. For example, a call may be routed to the call flow service having the overall fewest number of calls, such as the call flow service identified as number 24 in FIG. 3. Generally, new call flow services may be added to the top of the table 350, and de-allocated from the bottom of the FIFO table 350, although other implementations may be used. The active services table 350 may be updated and maintained by the call flow controller 220 of FIG. 2.

A bit table 355 may be stored to aid the signaling server 215 or other querying process to route a call to an appropriate call flow service. The bit table 355 includes an identification of each available call flow service, and an indication of whether the call flow service is available for baseline capacity 357 or surge capacity 359. For example, the call flow services 17, 20, and 24 may be available for baseline capacity in FIG. 3, while the call flow services 11-29 may be available for surge capacity. The signaling server 215 may access the bit table 355 to readily identify the lowest call flow service available for baseline capacity to route an incoming call, or if no call flow services are available for baseline capacity, a lowest call flow service available for surge capacity. The indicator is shown as a 'Y' in FIG. 3, although any indication may be used including a '0' or '1'.

A table 360 of services being initialized may also be stored. The table 360 may be a first-in-first-out table, although other implementations may be used. The table 360 includes an identifier for the call flow service being initialized, and an amount of time the call flow service has been initializing. When no call flow services are being initialized, the call flow controller 220 may start the process of initializing a new call flow service in some embodiments. In other embodiments, a different trigger, such as a load of the system, may be used to determine when a first additional call flow service should be initialized. In the example of FIG. 3, the additional call flow service 0 began to be initialized 85 seconds ago when the last additional call flow service to be initialized was placed into availability. When the load of the system, as indicated in the current load 327 field, exceeds the baseline load 330 plus a baseline capacity of the number of call flow services being initialized, the call flow controller 220 may begin initialization of an additional call flow service. Accordingly, in FIG. 3, the additional call flow service 1 in the table 360 began to be initialized 12 seconds ago when the current load exceeded the maximum baseline load plus the baseline capacity of the initializing call flow service 0. Similarly, the additional call flow service 2 began to be initialized 2 seconds ago when the current load exceeded the maximum baseline load plus the capacity of the initializing services 0 and 1. When the initialization of a call flow service is complete, it may be removed from the services being initialized table 360 and added to the active services table 350. In some embodiments, empirical data, such as historical system performance or load, may be used to determine whether or not to allocate additional call flow services to support projected future demand. In this manner, the capacity of the system may be increased in advance of an increase in system load. Likewise, empirical data may be used to determine whether or not to deallocate call flow services.

Accordingly, examples of systems for multi-tenanted cloud computing call centers have been described above that may utilize load balancing to adjust a number of available call flow services used to process calls. By way of summary, example methods for operating the cloud computing call centers will now be described.

Figure 4:
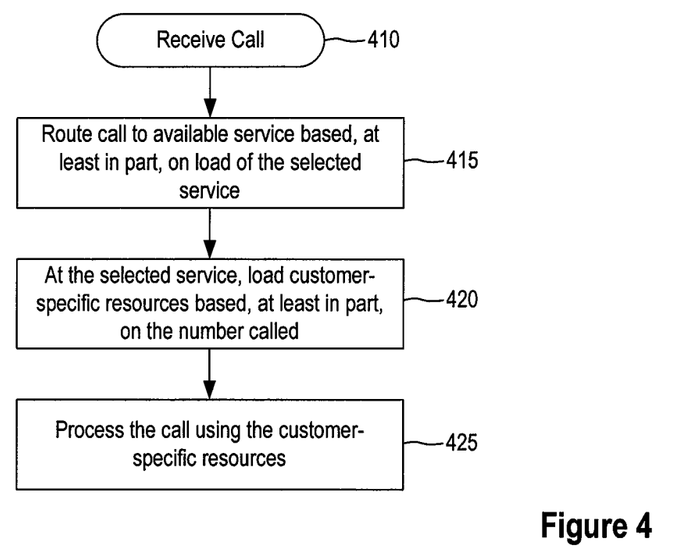
FIG. 4 is a flowchart illustrating an example method of servicing a call in a cloud computing call center in accordance with an embodiment of the present invention.

FIG. 4 is a flowchart illustrating an example method of servicing a call in a cloud computing call center in accordance with an embodiment of the present invention. In block 410, a call is received. The call may be received, for example, in accordance with the SIP protocol. In block 415, the call may be routed to an available call flow service based, at least in part, on a load of the available call flow service.

In some embodiments, allocation and de-allocation of a call flow service corresponds with allocation and de-allocation of a virtual instance. In some embodiments, an additional call flow service may be added to an existing virtual instance, or de-allocated from a surviving virtual instance.

The signaling server 215 of FIG. 2 may perform the routing in block 415. As generally described above, a call flow service with a lowest overall load may be selected, or a lowest call flow service on the active services table 350 of FIG. 3 having a load below a baseline capacity may be selected. When all available call flow services are over baseline capacity, a call flow service with a lowest overall load below a surge capacity may be selected, or a lowest call flow service on the active services table 350 of FIG. 3 having a load below the surge capacity may be selected. In other embodiments, other factors may be used to select the call flow service. In block 420, once the call is routed to the selected call flow service, the selected call flow service may load customer-specific resources based, at least in part, on the number called. The loading may be performed by the call manager 235 of FIG. 2, and has been described above. In this manner, a single call flow service may handle calls for multiple customers. In block 425, the call is processed using the loaded customer-specific resources.

Figure 5:
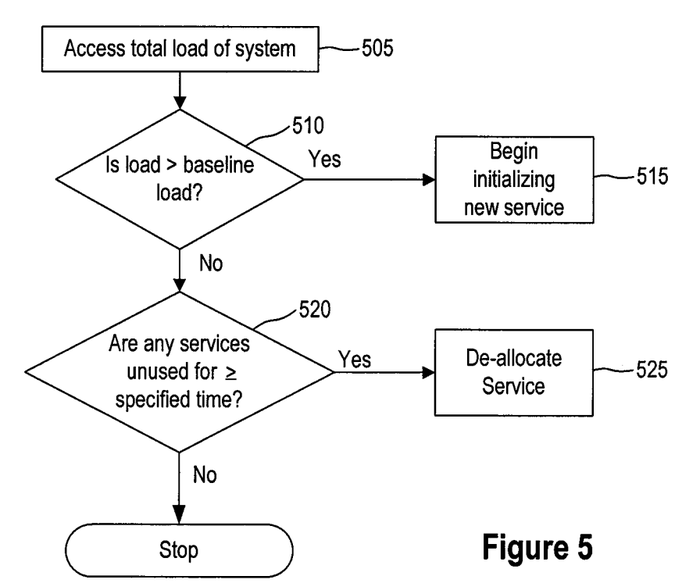
FIG. 5 is a flowchart illustrating an example method for allocating and de-allocating services in accordance with an embodiment of the present invention.

FIG. 5 is a flowchart illustrating an example method for allocating and de-allocating call flow services in accordance with an embodiment of the present invention. In block 505, a total load of the cloud computing call center may be accessed. The call flow controller 220 of FIG. 2 may access the total load by accessing stored information in the signaling server database 260, call center database 255, or by receiving an indication from the status monitor 205 of the total load. The call flow controller 220 may compute the total load based on individual loads reported by the available call flow services in some embodiments. In block 510, the total load may be compared with a baseline load. The call flow controller 220 of FIG. 2 may perform the comparison. The baseline load may be stored, for example in the table 325 of FIG. 3. If the current load is greater than the base line load, in block 515 a new call flow service will be initialized by the call flow controller 220. The call flow controller 220 may initiate the initialization of a new call flow service directly, or through a cloud provider interface, as generally described above. In some embodiments, a new call flow service is initialized when the current load exceeds the baseline load plus the baseline capacity of any call flow services already being initialized. If the current load is less than or equal to the baseline load, in block 520, one or more call flow services may be de-allocated. In some embodiments, an oldest call flow service may be de-allocated regardless of load. In some embodiments, the load of available call flow services may be accessed to identify any call flow services that have been unused for greater than or equal to a threshold time. The threshold time may be stored for example in the table 305 of FIG. 3, and the call flow controller 220 may access the active services table 350 to identify any unused call flow services, or in some examples, call flow services having a load below a low threshold value. If a call flow service has been unused for equal to or longer than a threshold time, the call flow service may be de-allocated in block 525. The call flow controller 220 may itself de-allocate call flow services or may initiate the de-allocation through a cloud provider interface.

Accordingly, systems and methods have been described above that provide cloud computing call centers. Call flow services have been described that may be configured for various different customers when initialized and may not store unique data when finished processing calls. In this manner, dynamic scale and multi-tenancy may be offered in a cloud based telephony system. The provider of the cloud based telephony system accordingly may pay for service based on the processing power and storage space consumed, and may charge customers based on actual use, as opposed to peak capacity.

Embodiments of the present invention may also provide peer-to-peer telephony between traditional PBXes. Cloud computing call centers described above included PBX functionality themselves, such as by including ACD 210 components in FIG. 2, or media processors 240. In some embodiments, cloud telephony systems may be provided that do not provide traditional PBX functionality.

Figure 6:
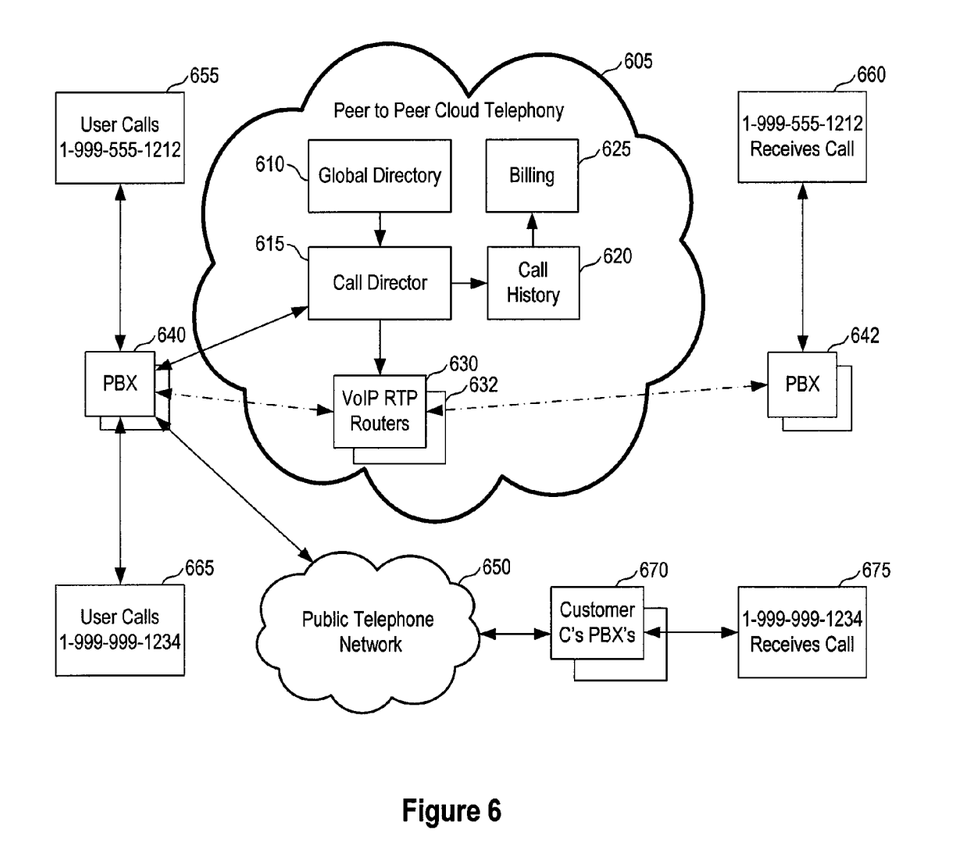
FIG. 6 is a schematic illustration of a system including a peer-to-peer cloud telephony system in accordance with an embodiment of the present invention.

FIG. 6 is a schematic illustration of a system including a peer-to-peer cloud telephony system in accordance with an embodiment of the present invention. The peer-to-peer cloud telephony system 605 includes a global directory 610, call director 615, a call history log 620, and billing module 625. One or more RTP 630, 632 routers may be provided. The RTP routers 630, 632 may not process calls, but may route traffic between or among different PBXes, such as the PBXes 640 and 642. By routing communication through the peer-to-peer cloud telephony system 605, users may avoid public telephone network 650.

The global directory 610 may store numbers enrolled in the peer-to-peer cloud telephony service. Enrolled numbers may take advantage of the call routing capabilities of the peer-to-peer cloud telephony service 605. The call director 615 may check incoming calls against those registered in the global directory 610. If the number is enrolled in the service, the call may be routed through one of the RTP routers. If the number is not enrolled in the service, the call may be routed through the public telephone network 650. If the call is routed through one of the RTP routers 630, 632, a record of the call is stored in the call history 620, and the billing module 625 may bill customers in accordance with the call history 620. Embodiments of the peer-to-peer system may be implemented using any type of network connectivity, such as the Internet, and suitable call protocols, such as VoIP.

In an example shown in FIG. 6, in block 655, a user may call a number 1.999.555.1212 using a PBX 640. The PBX 640 may communicate data about a call with the peer-to-peer cloud telephony system 605, and the call director may access the global directory 610 and determine the number 1.999.555.1212 is registered with the global directory 610. Accordingly, the call may be provided to the RTP router 630, which may route the call in accordance with the number to a PBX 642. In block 660, a customer of the peer-to-peer cloud telephony system 605 accessible at 1.999.555.1212 may receive the call.

In another example, in block 665, a user may dial 1.999.999.1234 through the PBX 640. The peer-to-peer cloud telephony system 605 may check the number against the global directory 610, and determine the number 1.999.999.1234 is not registered with the peer-to-peer cloud telephony system 605. Accordingly, the call may be routed through the public telephone network 650 to the destination PBX 670. In block 675, the call to 1.999.999.1234 is received.

Accordingly, the PBXs 640 and 642 may be registered with the peer to peer cloud telephony system 605 and may be configured to communicate with the peer to peer cloud telephony system 605 for each incoming call whether the call may be serviced by the peer to peer cloud telephony system 605 without use of the public telephone network 650. This may allow the public telephone network 650 to be bypassed, along with its associated costs.

The peer-to-peer cloud telephony system 605 may dynamically allocate and de-allocate RTP routers in accordance with demand, as generally described above for the allocation and de-allocation of call flow services. However, in the example of FIG. 6, audio is not processed by the peer-to-peer cloud telephony system 605. In some examples, a peer-to-peer cloud telephony system 605 for routing call data may be provided in combination with a cloud computing call center, such as the cloud computing call center 105 of FIG. 1, to both service calls and route peer-to-peer call data.

In some embodiments, RTP routers may not be required to connect calls from the PBX 640 to the PBX 642. For example, the peer to peer cloud telephony system 605 may utilize a NAT traversal technique to connect calls from the PBX 640 directly to the PBX 642.

In some embodiments, the peer-to-peer telephony solution may allow for the transport of telephone calls between major telecommunication providers such as wireless carriers and traditional public switched telephone network providers.

From the foregoing it will be appreciated that, although specific embodiments of the invention have been described herein for purposes of illustration, various modifications may be made without deviating from the spirit and scope of the invention.

What is claimed is:

1. A method for peer-to-peer telephony, the method comprising:
   receiving a call including a number called;
   accessing a directory of peer-to-peer telephony customers;
   when the number called is in the directory, routing the call over an Internet to a PBX associated with the number called; and
   when the number called is not in the directory, routing the call to a public telephone network.

2. The method of claim 1, wherein the act of routing the call over the Internet comprises routing VoIP packets to the PBX.

3. The method of claim 1, wherein the act of routing the call over the Internet comprises processing the call with a software router.

4. The method of claim 3, wherein a number of the software routers is determined dynamically based, at least in part, on a total number of calls in process.

5. The method of claim 3, further comprising maintaining a log of calls routed over the Internet.

\* \* \* \* \*